United States Patent [19]

Schultz et al.

[11] 4,332,607
[45] Jun. 1, 1982

[54] OVERHEAD MECHANISM FOR FLAT GLASS FORMING TWEEL

[75] Inventors: Stephen J. Schultz; Ronald R. Zito, both of Pittsburgh, Pa.

[73] Assignee: PPG Industries, Inc., Pittsburgh, Pa.

[21] Appl. No.: 211,166

[22] Filed: Nov. 28, 1980

[51] Int. Cl.³ .............................................. C03B 18/16
[52] U.S. Cl. .................................. 65/182.5; 65/99.2; 65/164; 65/333
[58] Field of Search ................. 65/29, 99 A, 164, 333, 65/182.4, 182.5, 158

[56] References Cited

U.S. PATENT DOCUMENTS 3,764,285 10/1973 Matesa et al. ...................... 65/99 A
4,255,180 3/1981 Wolfe .............................. 65/182.4 X

*Primary Examiner*—Arthur D. Kellogg
*Attorney, Agent, or Firm*—Dennis G. Millman

[57] ABSTRACT

A tweel flow control device at the entrance to a flat glass forming chamber is provided with overhead support and elevator means, preferably adapted to convey the tweel from its operative location.

6 Claims, 3 Drawing Figures

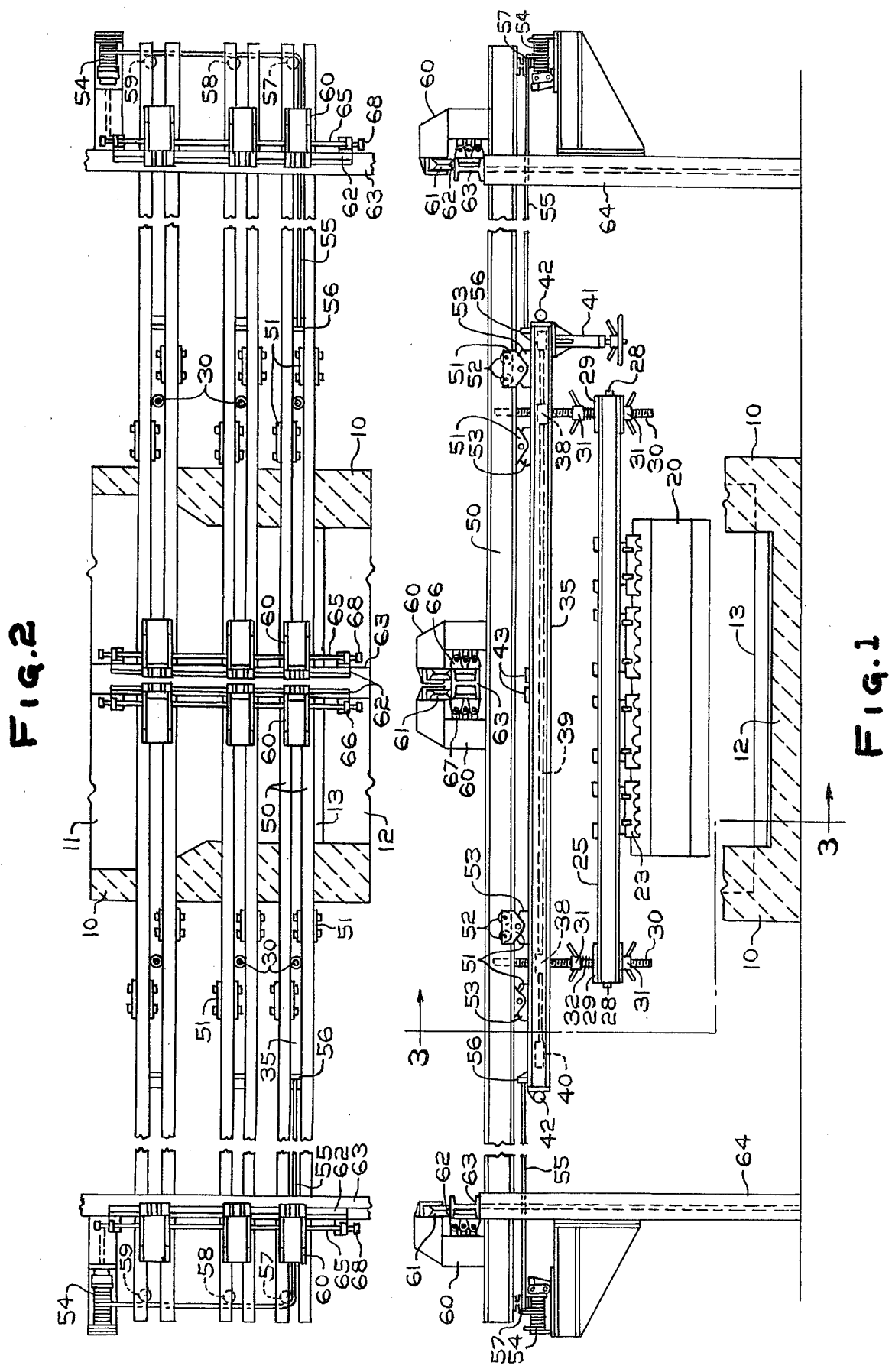

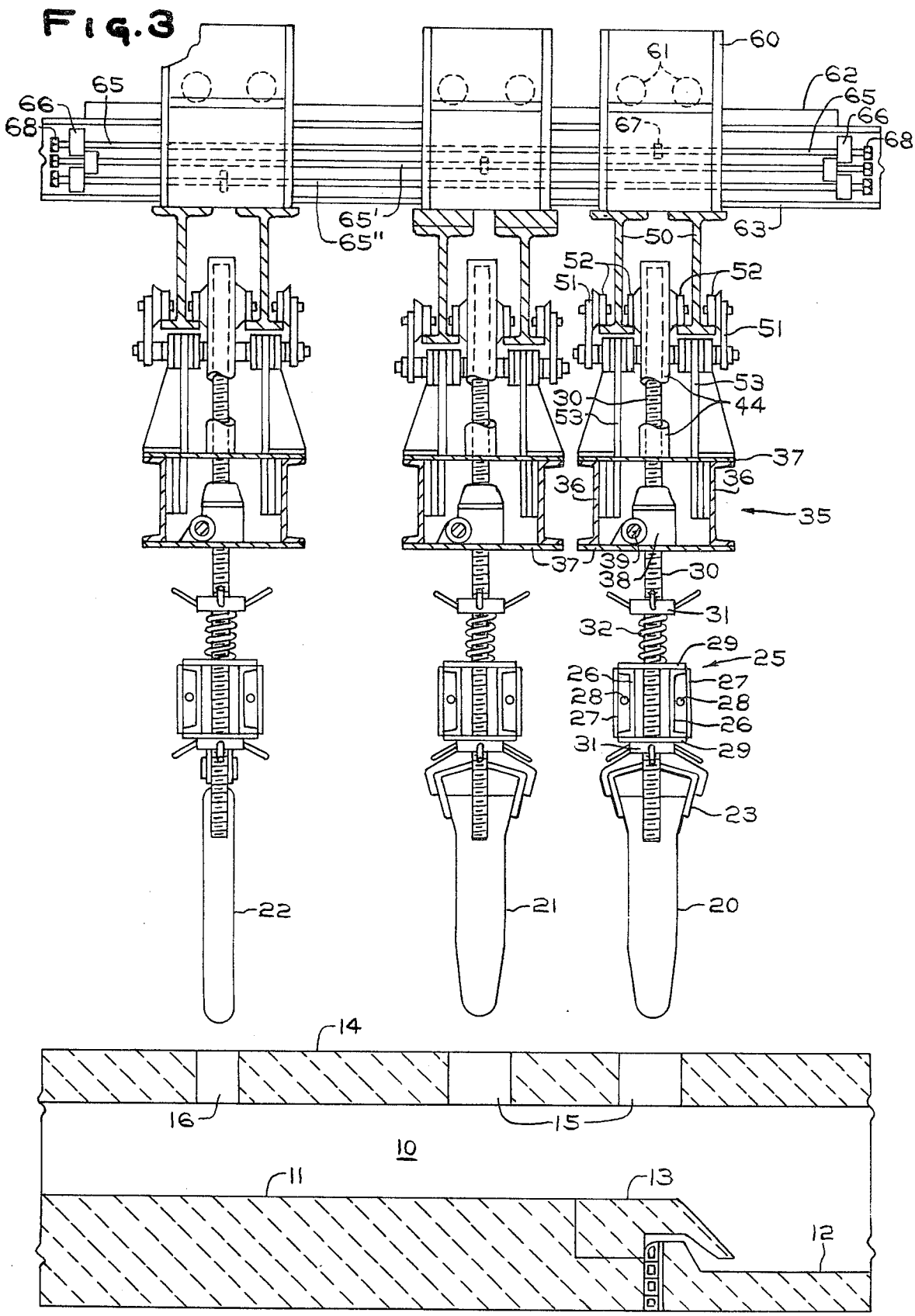

OVERHEAD MECHANISM FOR FLAT GLASS FORMING TWEEL

BACKGROUND OF THE INVENTION

This invention relates to the float process for forming flat glass where molten glass is continuously delivered onto one end of a pool of molten metal, where it is drawn to a ribbon of desired thickness and withdrawn as a continuous ribbon of glass from the opposite end of the pool of molten metal. More particularly, this invention relates to improvements in the delivery section of such an apparatus. In the delivery section, the flow of molten glass from a melting furnace into the forming chamber is regulated by means of one or more vertically adjustable gates known as "tweels." A tweel typically comprises a ceramic piece in contact with the molten glass and supported from above on a steel bridge structure, which is external to the molten glass containing enclosure. Typically, floor mounted jack screws engage the bridge structure and adjust the height of the tweel. An example of such an arrangement may be seen in U.S. Pat. No. 3,764,285 (Matesa et al.).

Because the lower tip of a tweel is in constant contact with molten glass moving at a relatively high velocity, a tweel is subject to erosion and, therefore, usually must be replaced at intervals considerably shorter than a normal furnace campaign. To replace a tweel, an overhead crane is usually employed to lift the tweel and bridge structure above the delivery section of the furnace so that the tweel may be disassembled from its supporting structure and a new tweel installed in place thereof. Providing a crane in that region of the installation is costly due to the high temperature environment. Working on the tweel above the delivery section of the furnace is also inconvenient.

The final piece of refractory over which the molten glass flows before flowing onto the molten metal support in the forming chamber is termed the "threshold" (or "lipstone"). Because a threshold is also subject to heavy wear and must occasionally be replaced, it is considered desirable to mount a threshold on movable support means to enable the threshold to be extracted laterally from the delivery section. However, the floor mounted jack screws employed in the prior art for adjusting the height of the tweel obstruct the lateral retraction of a threshold. Therefore, it would be desirable for tweel height adjustment to be provided in a manner that does not interfere with lateral threshold movement.

SUMMARY OF THE INVENTION

In the present invention, the delivery section of a flat glass forming installation is provided with an overhead structure for supporting a tweel. The overhead support structure includes means to control the elevation of the tweel as well as means for lifting and removing a tweel from the delivery section and for installation of a new tweel. Furthermore, in the preferred embodiment, the lifting means is also capable of conveying a tweel laterally so as to enable a tweel to be removed from the hot environment above the delivery section so that a tweel may be assembled at the side of the delivery section. Another advantage of the overhead tweel support structure of the present invention is that its self-contained lifting mechanisms avoid obstructing the sides of the delivery section, thereby permitting lateral removal of a threshold member. In the preferred embodiment, the tweel support structure is also provided with means to adjust the position of the tweel in the longitudinal direction (the direction of glass travel). Accordingly, the tweel may be set into position accurately without the need for an overhead crane in the delivery section.

THE DRAWINGS

FIG. 1 is a transverse, cross-sectional view through the delivery section of a float glass forming installation showing the novel tweel supporting apparatus of the present invention with the tweel in a raised position.

FIG. 2 is a plan view of the apparatus of FIG. 1 showing three parallel overhead support structures for a pair of tweels and a water-cooled dam.

FIG. 3 is a cross-sectional end view taken along line 3—3 in FIG. 1 showing an embodiment incorporating three overhead support structures for a pair of tweels and a water cooled dam.

DETAILED DESCRIPTION

In FIGS. 1, 2 and 3 there is shown schematically a delivery section of a float glass forming apparatus having refractory side walls 10 and floor 11. In the downstream direction from the delivery section, is a float forming chamber comprised of a basin 12 adapted to hold a pool of molten metal. A refractory threshold member 13 supports molten glass as it flows from the delivery section onto the pool of molten metal contained in basin 12. The delivery section and forming chamber are shown in the drawings in a non-operating mode with no molten glass or molten metal being included.

Referring in particular to FIG. 3, the delivery section is provided with a roof 14 having slots 15 therethrough for insertion of a pair of tweels. Optionally, the roof may be provided with an opening 16 for insertion of a water-cooled dam in the event that shut-off of molten glass flow is desired. The upper portion of the side walls 10 and the roof 14 are cut away in FIGS. 1 and 2 for the sake of clarity. In FIG. 3, there may be seen that the preferred embodiment is provided with a primary tweel 20 and a back-up tweel 21. In operation, the tweel 20 would be lowered through its respective opening 15 in the roof of the delivery section so that the lower tip of the tweel 20 is spaced a short distance above the top surface of the threshold 13. Precisely establishing the gap between the tweel 20 and the threshold 13 is important for metering the flow of molten glass at the desired rate into the forming chamber. As the tip of tweel 20 erodes during prolonged use, the elevation of the tweel must be periodically adjusted to maintain the proper gap. Also, changes in the rate of production or the thickness of glass being produced may require the gap between the threshold and the tweel to be adjusted. The back-up tweel 21 may be employed to assist the metering function by being partially lowered into the flow of molten glass through the delivery section, or it may be maintained as a standby in the event of failure of the primary tweel 20, or to assist in cutting off the flow of molten glass in the event of a shut down of the forming chamber.

An optional feature of the embodiment shown is a water-cooled dam 22, which is lowered into the molten glass only when it is desired to stop the flow of molten glass through the delivery section. The water-cooled dam 22 may be metallic with a hollow interior for the circulation of water therethrough so that molten glass in its vicinity becomes frozen.

Each of the tweels 20 and 21 is gripped at its upper end by clamping means 23. The remainder of the support structures for each of the tweels 20 and 21 and the water-cooled dam 22 are identical. Therefore, a detailed description of only the support structure for the primary tweel will be set forth and that description will suffice as a description of all three support structures.

The tweel clamping devices 23 are suspended in a conventional manner from a beam 25 spanning the delivery section. The beam 25 may be a composite of a pair of channel beams 26 which, in the embodiment shown in FIG. 3, are closed by side plates 27 to create a pair of elongated hollow spaces through which cooling water may be pumped, if desired, in order to maintain structural rigidity of the beam 25 in the hot environment. Pipe fittings 28 (FIG. 1) are shown at the ends of the beam 25 for connection to a water supply and drain. Plates 29 at the top and bottom of the beam join the two sides of the beam together. Each end of the tweel supporting beam 25 is supported by a vertically extended threaded shaft 30. The mounting of the beam 25 onto each shaft 30 is spring loaded by means of a pair of adjusting nuts 31 and a spring 32. Spring loading prevents binding in the event of overextension of shaft 30. Fine adjustment of the elevation and angle of the tweel may be carried out by turning the adjusting nuts 31.

Upper portions of the threaded shafts 30 are carried by a carriage beam 35 which is mounted above, and parallel to, the tweel supporting beam 25. As shown in FIG. 3 the carriage beam 35 may be a composite of channel beams 36 on the sides joined by top and bottom plates 37, which together form an elongated enclosure within the carriage beam. Within that enclosure are a pair of jack screws 38 which engage and provide a vertical reciprocation to the threaded shafts 30. The jack screws 38 are joined together by means of a shaft 39 extending along the length of the carriage beam 35 and coupled to a motor 40 at one end. Operation of the motor provides vertical reciprocation of both shafts 30 in unison so as to raise or lower the tweel. In this manner, the tweel may be lifted above and out of the delivery section. Manual crank means 41 are provided at the opposite end of shaft 39 to enable the tweel to be raised or lowered in the event of power failure or failure of the motor 40. Because of the hot environment, the carriage beam may be provided with cooling means. As shown in FIG. 1, each end of the carriage beam may be provided with an air blower 42 which forces air along the interior of the beam and is vented at the center of its length through vents 43. As may be seen in FIG. 3, there may mounted to the upper side of the carriage beam, a tall cylindrical dust cover 44 within which the threaded shaft 30 may move vertically.

The carriage beam 35 is supported from above on a monorail-like system for movement parallel to its length (tranversely of the delivery section). In the preferred embodiment, as depicted in FIG. 3, a dual monorail arrangement is employed for stability against swaying and is based on a pair of monorail beams 50. A pair of monorail trucks 51, each comprised of a set of four flaired wheels 52, ride along the bottom flange of each monorail beam 50. To the underside of each monorail truck 51, there is attached a downwardly extending bracket 53 which is fastened to the upper side of the carriage beam 35. By means of this arrangement, a tweel having been raised to the elevated position, may be readily moved along the monorail system to an open area alongside the delivery section. Manual motive power may be sufficient in some cases to move the structure along the monorail, or it may be desirable to provide a pair of winches 54 at opposite ends of the monorail beams 50, one winch to pull the tweel supporting structure to the side, and the other to return the structure to its normal position above the delivery section. A cable 55 from each winch may engage a respective end of the carriage beam 35 by means of a lug 56. As may be seen in FIG. 2, a single pair of winches 54 may be interchangeably connected to any one of the three tweel supporting structures by way of pulleys 57, 58 or 59.

In order to accurately locate a tweel relative to the structure of the delivery section, it is desirable to provide adjustability to a tweel in the upstream/downstream direction (the longitudinal direction) as well. In the preferred embodiment, this longitudinal adjustability is provided by supporting the monorail beams 50 on an overhead trolley system comprised of a plurality of hanger arms 60 having grooved wheels 61 that ride on tracks 62. The tracks are based on horizontally extending stationary beams 63 which, in turn, may be supported by vertical beams 64. Movement of beams 50 relative to beams 63, is effected by means of a threaded rod 65 rotatably held at each end in a bearing 66 which is, in turn, mounted on beam 63. The rod 65 is threaded through a lug 67 which projects from the underside of support arm 60. Thus, by turning a nut 68 welded to the end of rod 65 (see FIG. 3), lug 67 is translated along the length of the rod 65 thereby carrying with it the support arms 60, the monorail beams 50, and the entire tweel support structure supported thereon. As shown in FIG. 2, each support arm 60 has associated therewith a threaded rod 65, and longitudinally adjusting the position of a tweel support requires turning each of the threaded rods. Similarily, parallel threaded rod adjusting arrangements are provided for adjusting the positions of the back-up tweel and the water-cooled dam 22 by way of threaded rods 65' and 65" respectively.

A specific preferred embodiment has been described in detail for the sake of illustrating the invention and for disclosing the best mode, but it should be understood that other variations and modifications as are known to those of skill in the art may be resorted to without departing from the scope of the invention as defined by the claims which follow.

We claim:

1. An apparatus for producing flat glass including a longitudinally spaced melting furnace and forming chamber and a delivery section therebetween providing a path for a flow of molten glass in the longitudinal direction from the melting furnace into the forming chamber; tweel flow control means in the delivery section for controlling the flow of molten glass therethrough; a first support structure from which the tweel means are suspended; elevator means over the delivery section for supporting the first support structure and the tweel means; carriage means above the delivery section for supporting the elevator means and for providing to the elevator means, first support structure, and tweel means mobility in a horizontal direction transverse to the longitudinal direction.

2. The apparatus of claim 1 wherein the first support structure includes a transversely extending beam structure, and the carriage means includes a second transversely extending beam structure and wheels in rolling engagement with a third transversely extending beam structure.

3. The apparatus of claim 1 wherein the elevator means is provided with sufficient vertical travel to lift the tweel above the delivery section.

4. The apparatus of claim 1 wherein said elevator means comprise a pair of vertically extending threaded shafts and jack means coacting with the shafts.

5. The apparatus of claim 4 wherein the jack means are supported on the carriage means, and the jack means coact with the threaded shafts so as to move the shafts and the first support structure vertically.

6. The apparatus of claim 5 further including means to adjust vertically the position of the first support structure on the threaded shaft.

* * * * *